United States Patent
Khlat

(10) Patent No.: US 9,143,208 B2
(45) Date of Patent: Sep. 22, 2015

(54) RADIO FRONT END HAVING REDUCED DIVERSITY SWITCH LINEARITY REQUIREMENT

(71) Applicant: RF Micro Devices, Inc., Greensboro, NC (US)

(72) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 99 days.

(21) Appl. No.: 13/942,778

(22) Filed: Jul. 16, 2013

(65) Prior Publication Data

US 2014/0024322 A1 Jan. 23, 2014

Related U.S. Application Data

(60) Provisional application No. 61/673,027, filed on Jul. 18, 2012.

(51) Int. Cl.
| | |
|---|---|
| *H04B 1/44* | (2006.01) |
| *H04B 7/04* | (2006.01) |
| *H04B 7/06* | (2006.01) |
| *H04B 7/08* | (2006.01) |
| *H04B 1/00* | (2006.01) |

(52) U.S. Cl.
CPC .............. *H04B 7/0404* (2013.01); *H04B 1/006* (2013.01); *H04B 7/0602* (2013.01); *H04B 7/0802* (2013.01)

(58) Field of Classification Search
CPC ...................................... H04B 7/404
USPC ............................. 455/78, 188.1, 574; 370/278
See application file for complete search history.

(56) References Cited

U.S. PATENT DOCUMENTS

| | | | |
|---|---|---|---|
| 4,498,057 A | 2/1985 | Noro | |
| 5,502,422 A | 3/1996 | Newell et al. | |
| 6,091,970 A | 7/2000 | Dean | |
| 6,128,474 A | 10/2000 | Kim et al. | |
| 6,405,018 B1 * | 6/2002 | Reudink et al. | ................. 455/20 |
| 7,187,945 B2 * | 3/2007 | Ranta et al. | ................ 455/552.1 |
| 7,212,788 B2 | 5/2007 | Weber et al. | |
| 7,251,499 B2 | 7/2007 | Ellä et al. | |

(Continued)

OTHER PUBLICATIONS

Author Unknown, "3rd Generation Partnership Project; Technical Specification Group Radio Access Network; Evolved Universal Terrestrial Radio Access (E-UTRA); User Equipment (UE) Radio Transmission and Reception (Release 11)," Technical Specification 36.101, Version 11.1.0, Jun. 2012, 3GPP Organizational Partners, 336 pages.

(Continued)

*Primary Examiner* — Tuan H Nguyen
(74) *Attorney, Agent, or Firm* — Withrow & Terranova, P.L.L.C.

(57) ABSTRACT

A radio front end that includes a diversity switch module adapted to route diversity receive (RX) signals to transceiver circuitry from diversity antenna switch circuitry coupled to at least one diversity antenna port is disclosed. The radio front end further includes ultrahigh band (UHB) switch circuitry adapted to route UHB transmit (TX) signals from power amplifier and switch circuitry to a UHB antenna port and/or to at least one diversity antenna port. The UHB switch circuitry is also adapted to route UHB RX signals from the UHB antenna port and/or to at least one antenna port to the transceiver circuitry, wherein the UHB RX signals include band 7 (B7) wherein linearity of the UHB switch circuitry is greater than linearity of the diversity switch module.

20 Claims, 4 Drawing Sheets

(56) References Cited

U.S. PATENT DOCUMENTS

| | | | |
|---|---|---|---|
| 7,864,491 | B1 | 1/2011 | Bauder et al. |
| 7,872,547 | B2 | 1/2011 | Song et al. |
| 7,973,645 | B1 | 7/2011 | Moretti et al. |
| 7,996,003 | B2 | 8/2011 | Maeda et al. |
| 8,208,867 | B2 | 6/2012 | Lum et al. |
| 8,437,438 | B2 | 5/2013 | Kuwahara |
| 8,565,701 | B2 | 10/2013 | Sanchez et al. |
| 8,571,489 | B2 | 10/2013 | Mikhemar et al. |
| 8,634,029 | B2 | 1/2014 | Pugel |
| 8,718,582 | B2 | 5/2014 | See et al. |
| 8,774,065 | B2 | 7/2014 | Khlat et al. |
| 8,774,067 | B2 | 7/2014 | Rousu et al. |
| 2005/0245202 | A1 | 11/2005 | Ranta et al. |
| 2005/0277387 | A1 | 12/2005 | Kojima et al. |
| 2006/0012425 | A1 | 1/2006 | Ohnishi et al. |
| 2006/0025171 | A1 | 2/2006 | Ly et al. |
| 2006/0240785 | A1 | 10/2006 | Fischer |
| 2006/0276132 | A1 | 12/2006 | Sheng-Fuh et al. |
| 2006/0293005 | A1 | 12/2006 | Hara et al. |
| 2007/0280185 | A1 | 12/2007 | McFarland et al. |
| 2008/0003797 | A1 | 1/2008 | Kim |
| 2009/0180403 | A1 | 7/2009 | Tudosoiu |
| 2009/0303007 | A1 | 12/2009 | Ryou et al. |
| 2010/0079347 | A1 | 4/2010 | Hayes et al. |
| 2010/0099366 | A1 | 4/2010 | Sugar et al. |
| 2010/0291888 | A1 | 11/2010 | Hadjichristos et al. |
| 2011/0241782 | A1 | 10/2011 | Clifton |
| 2011/0241787 | A1 | 10/2011 | Mastovich |
| 2011/0250926 | A1 | 10/2011 | Wietfeldt et al. |
| 2012/0235735 | A1 | 9/2012 | Spits et al. |
| 2012/0281597 | A1 | 11/2012 | Khlat et al. |
| 2013/0122824 | A1 | 5/2013 | Schell |
| 2013/0320803 | A1 | 12/2013 | Maeda |
| 2013/0321095 | A1 | 12/2013 | Lam et al. |
| 2013/0336181 | A1 | 12/2013 | Khlat et al. |
| 2013/0337752 | A1 | 12/2013 | Khlat |
| 2013/0337754 | A1 | 12/2013 | Khlat |
| 2014/0015731 | A1 | 1/2014 | Khlat et al. |
| 2014/0024329 | A1 | 1/2014 | Khlat |
| 2014/0038675 | A1 | 2/2014 | Khlat et al. |
| 2014/0051372 | A1 | 2/2014 | Shoshan et al. |
| 2014/0073371 | A1 | 3/2014 | Mujtaba et al. |
| 2014/0092795 | A1 | 4/2014 | Granger-Jones |
| 2014/0106693 | A1 | 4/2014 | Khlat |
| 2014/0227982 | A1 | 8/2014 | Granger-Jones et al. |

OTHER PUBLICATIONS

Author Unknown, "MIPI Alliance Application Note for Analog Control Interface-Envelope Tracking," ACI-ET, Version 1.0.0, Release 19, Oct. 4, 2012, 1 page.

Djoumessi, Erick Emmanuel, et al., "Electronically Tunable Diplexer for Frequency-Agile Transceiver Front-End," 2010 IEEE MTT-S International Microwave Symposium Digest (MTT), May 23-28, 2010, pp. 1472-1475.

Valkenburg, M.E., VAN. "12.2 Pole Reciprocation." Analog Filter Design. New York: CBS College Publishing, 1982. pp. 327-333.

Wang, Zhao-Ming, et al., "The Design of a Symmetrical Diplexer Composed of Canonical Butterworth Two-Port Networks," 1988 IEEE International Symposium on Circuits and Systems, vol. 2, Jun. 7-9, 1988, pp. 1179-1182.

Williams, Arthur Bernard, et al. Electronic Filter Design Handbook, 3rd. ed. New York: McGraw-Hill, 1995. pp. 3.1-4.7 and 11.72-11.73.

Zverev, Anatol I., Handbook of Filter Synthesis, New York: John Wiley & Sons, 1967. pp. 192-193.

Notice of Allowance for U.S. Appl. No. 13/460,861, mailed Jan. 30, 2014, 9 pages.

Notice of Allowance for U.S. Appl. No. 13/045,604, mailed May 17, 2013, 11 pages.

Non-Final Office Action for U.S. Appl. No. 13/045,621, mailed May 31, 2013, 13 pages.

Notice of Allowance for U.S. Appl. No. 13/045,621, mailed Sep. 24, 2013, 10 pages.

Non-Final Office Action for U.S. Appl. No. 13/852,527, mailed Sep. 30, 2014, 19 pages.

Non-Final Office Action for U.S. Appl. No. 13/852,309, mailed Oct. 14, 2014, 10 pages.

Non-Final Office Action for U.S. Appl. No. 13/944,972, mailed Nov. 13, 2014, 10 pages.

Final Office Action for U.S. Appl. No. 13/852,527, mailed Jan. 12, 2015, 21 pages.

Final Office Action for U.S. Appl. No. 13/852,309, mailed Feb. 18, 2015, 12 pages.

Notice of Allowance and Examiner-Initiated Interview Summary for U.S. Appl. No. 14/052,221, mailed Feb. 26, 2015, 9 pages.

Non-Final Office Action for U.S. Appl. No. 13/929,987, mailed Jan. 30, 2015, 11 pages.

Non-Final Office Action for U.S. Appl. No. 13/852,527, mailed Apr. 23, 2015, 23 pages.

Advisory Action for U.S. Appl. No. 13/852,309, mailed Apr. 29, 2015, 4 pages.

Advisory Action for U.S. Appl. No. 13/852,309, mailed May 27, 2015, 4 pages.

Notice of Allowance for U.S. Appl. No. 13/944,972, mailed Apr. 13, 2015, 7 pages.

Non-Final Office Action for U.S. Appl. No. 14/051,601, mailed May 5, 2015, 6 pages.

Notice of Allowance for U.S. Appl. No. 13/852,309, mailed Jul. 23, 2015, 7 pages.

Notice of Allowance for U.S. Appl. No. 13/929,987, mailed Jun. 23, 2015, 8 pages.

Non-Final Office Action for U.S. Appl. No. 13/950,432, mailed Jul. 28, 2015, 14 pages.

Non-Final Office Action for U.S. Appl. No. 13/952,880, mailed Jul. 29, 2015, 17 pages.

Corrected Notice of Allowance for U.S. Appl. No. 13/929,987, mailed Jul. 21, 2015 5 pages.

* cited by examiner

RADIO FRONT END HAVING REDUCED DIVERSITY SWITCH LINEARITY REQUIREMENT

RELATED APPLICATIONS

This application claims the benefit of U.S. provisional patent application No. 61/673,027, filed Jul. 18, 2012, the disclosure of which is incorporated herein by reference in its entirety.

FIELD OF THE DISCLOSURE

The present disclosure relates to radio front ends used in radio frequency (RF) communications circuitry.

BACKGROUND

A new radio front end is needed to support a world phone or world tablet type user equipment having three or more antennas that are used to operate in a carrier aggregation mode for many band combinations. For example, the radio front end of a world phone or world tablet is required to support band 7 (B7) of Long-Term Evolution Frequency Division Duplex (LTE FDD) along with bands B38, B40, B41, and B41 Extended Global Platform (XGP) LTE Time Division Duplex (TDD), which covers a bandwidth that ranges from 2300 MHz to 2700 MHz. Several of the bands within the 2300 MHz to 2700 MHz bandwidth have no requirement for carrier aggregation support. Examples of these bands are B7 FDD and TDD bands B38, B40, B41, and B41 XGP. The listed bands requiring diversity RX employ multiple-input and multiple-output (MIMO) techniques that use two receivers. However, it is to be understood that bands involving Global System for Mobile (GSM) and enhanced data rates for GSM Evolution (EDGE) do not require MIMO techniques. Another requirement for world phone or world tablet type user equipment is implementation of an antenna swapping technique that can change which of two antennas is used as a main antenna while the other antenna is used as a diversity/RX MIMO antenna. The antenna swapping technique allows a world tablet type user equipment to select a best antenna for achieving total radiated power (TRP). Yet another requirement calls for a technique that switches between three different antennas for operation in bands between 2300 MHz to 2700 MHz. A downlink frequency range for B7 extends from 2620 MHz to 2690 MHz.

FIG. 1 is a schematic of a related art radio front end 10 that supports world phone/world tablet bands such as those exemplified above along with carrier aggregation and receiver diversity. The radio front end 10 includes transceiver circuitry 12 that outputs second generation (2G), third generation (3G), and fourth generation (4G) low band (LB) and high band (HB) transmit (TX) signals to power amplifier and switch circuitry 14. It is to be understood that the transceiver circuitry 12 includes a plurality of transceivers to cover the various communication modes used by world phone/world tablet type user equipment. A TX filters module 16 receives and filters the LB and HB signals that are amplified and switched by the power amplifier and switch circuitry 14. Diversity antenna switch circuitry 18 is coupled to the TX filters module 16 via transceiver signals paths TRX1-TRX10. Signals conducted by the transceiver signal paths TRX1-TRX10 are routed to at least one of a first antenna A1 and a second antenna A2 through a first diversity antenna port 20 and a second diversity antenna port 22, respectively.

A mixed filter module 24 filters TX signals that pass between ultrahigh band (UHB) switch circuitry 26 and the power amplifier and switch circuitry 14. The mixed filter module 24 also filters RX signals that pass between the transceiver circuitry 12 and the UHB switch circuitry 26. A UHB antenna A3 passes TX and RX signals through a UHB antenna port 28. An alternate RF signal path RF1 is used to route signals between the UHB switch circuitry 26 and the diversity antenna switch circuitry 18.

A diversity switch module 30 routes HB signals and LB signals from the diversity antenna switch circuitry 18 to the transceiver circuitry 12. The diversity switch module 30 includes an HB switch 32 having a pole coupled to the diversity antenna switch circuitry 18 via an HB RF path HB RF2. The diversity switch module 30 also includes an LB switch 34 having a pole coupled to the diversity antenna switch circuitry 18 via an LB RF path LB RF2. The diversity switch module 30 further includes a plurality of filters and diplexers 36 that are coupled to throws of the HB switch 32 and the LB switch 34. RX signals are conducted from the diversity switch module 30 to the transceiver circuitry 12 via receiver RF paths that include diversity receive (DRX) paths, a B7 RX path, and digital cellular service (DCS) receive paths. The B7 RX path includes a B7 filter 38 for filtering B7 RX signals. Both the B7 RX path and the B7 filter 38 are highlighted by bold text and a thick line. A practice of locating the B7 RX path and B7 filter 38 within the diversity switch module 30 is typical of radio front ends such as depicted in the related art radio front end 10. However, passing B7 frequency division duplex (FDD) signals through the HB switch 32 makes it necessary to increase the linearity of the HB switch 32 to a level that is relatively much greater than would be necessary for other diversity signals passed by the HB switch 32. This increased linearity requirement for B7 FDD is at least due in part to a necessity to coexist with the industrial, scientific, and medical (ISM) band. In fact, the linearity for the HB switch 32 requires a relatively very high linearity of around about +79 dBm in order to accommodate B7 FDD signals.

Thus, there is a need for a new radio front end that is configured to allow for a reduced diversity switch linearity requirement to support world phone or world tablet type user equipment having three or more antennas.

SUMMARY

The present disclosure provides a radio front end that includes a diversity switch module adapted to route diversity receive (RX) signals to transceiver circuitry from diversity antenna switch circuitry coupled to at least one diversity antenna port. The radio front end further includes an ultrahigh band (UHB) switch circuitry adapted to route UHB transmit (TX) signals from power amplifier and switch circuitry to a UHB antenna port and/or to at least one diversity antenna port. The UHB switch circuitry is also adapted to route UHB RX signals from the UHB antenna port and/or to at least one antenna port to the transceiver circuitry, wherein the UHB RX signals include band 7 (B7) wherein linearity of the UHB switch circuitry is greater than the linearity of the diversity switch module.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 is a schematic of a related art radio front end that supports world phone/world tablet bands along with carrier aggregation and receiver diversity.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
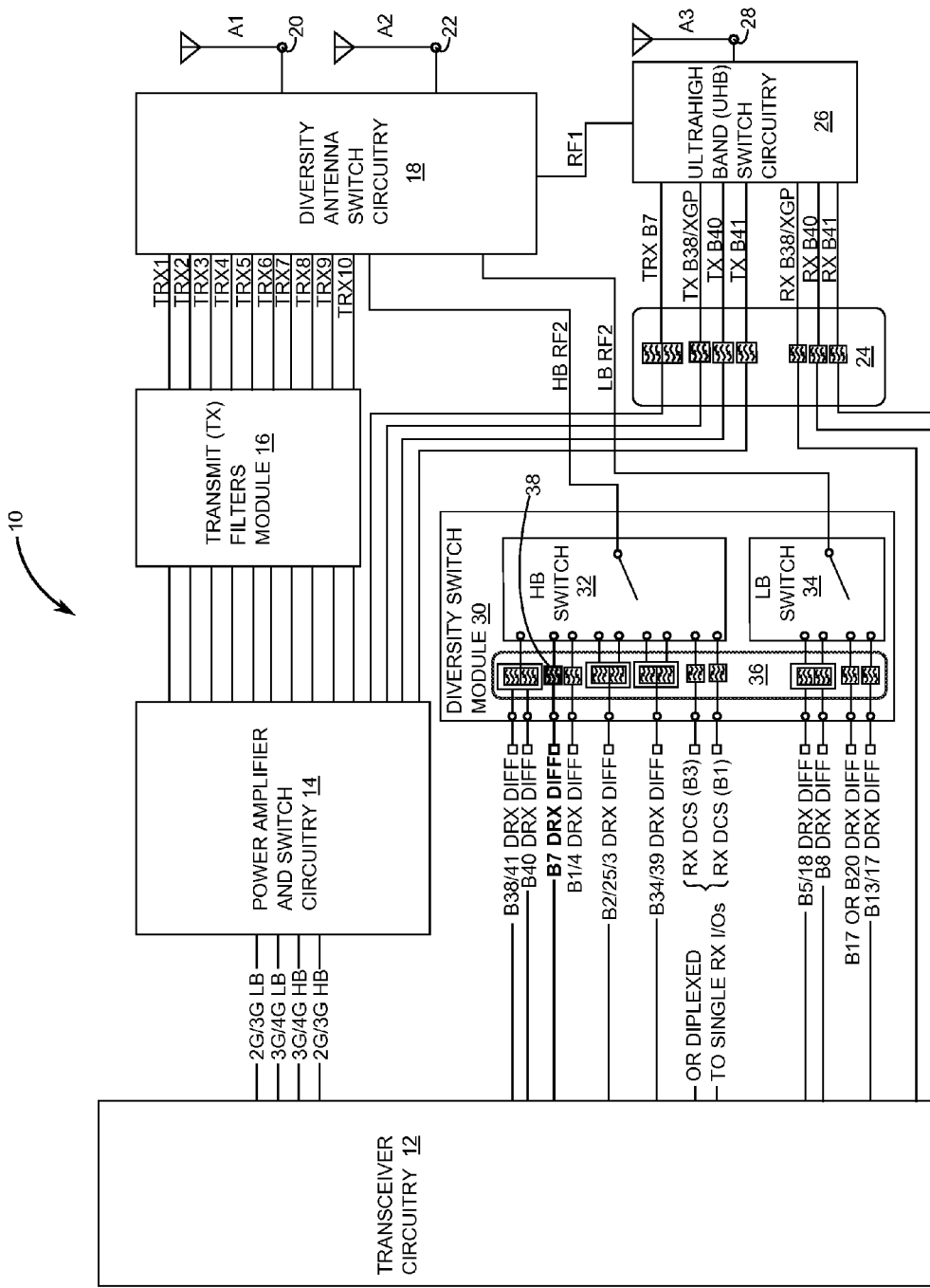
Figure 2:
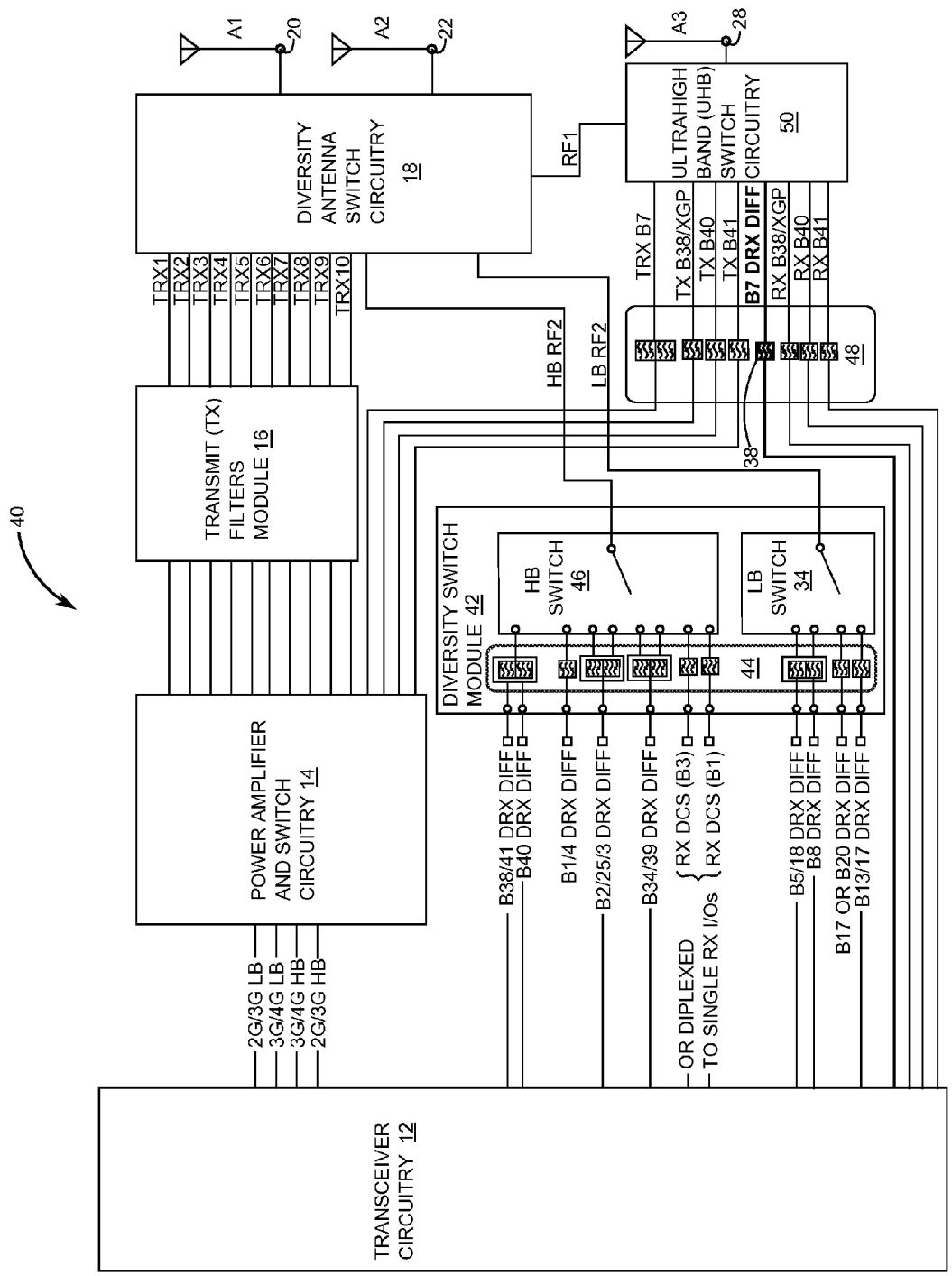
FIG. 2 is a schematic of an embodiment of a radio front end that in accordance with the present disclosure supports world phone/world tablet bands along with carrier aggregation and receiver diversity while also providing the radio front end with a reduced linearity requirement.

FIG. 2 is a schematic of an embodiment of a radio front end 40 that in accordance with the present disclosure supports world phone/world tablet bands along with carrier aggregation and receiver diversity while also providing a modified diversity switch module 42 having a reduced linearity requirement. Benefits of the radio front end 40 include a reduced cost and a new ability to route B7 RX diversity signals through any of the first diversity antenna port 20, the second diversity antenna port 22, and the UHB antenna port 28. The band 7 (B7) RX path and B7 filter 38 is removed from the modified diversity switch module 42 in order to reduce the linearity requirement for the radio front end 40. The modified diversity switch module 42 includes a new arrangement of a plurality of filters and diplexers 44 that does not include the B7 filter 38 while retaining the other filters and diplexers originally included in the plurality of filters and diplexers 36. Also retained as original is the LB switch 34 because there is no required change needed for the LB switch 34 since the B7 RX path and B7 filter 38 are not associated with the LB switch 34. However, a reduced linearity HB switch 46 replaces the original HB switch 32. The reduced linearity HB switch 46 does not include a switch throw for the B7 RX path. Therefore, the reduced linearity HB switch 46 typically includes one less switch throw than that needed for the HB switch 32 (FIG. 1).

The B7 filter 38 is relocated to a modified mixed filter module 48 that preferably retains the filters included in the mixed filter module 24 (FIG. 1). In this case, the B7 RX path is routed outside the modified diversity switch module 42 through the modified mixed filter module 48 to modified UHB switch circuitry 50 that includes the UHB antenna port 28.

Figure 3:
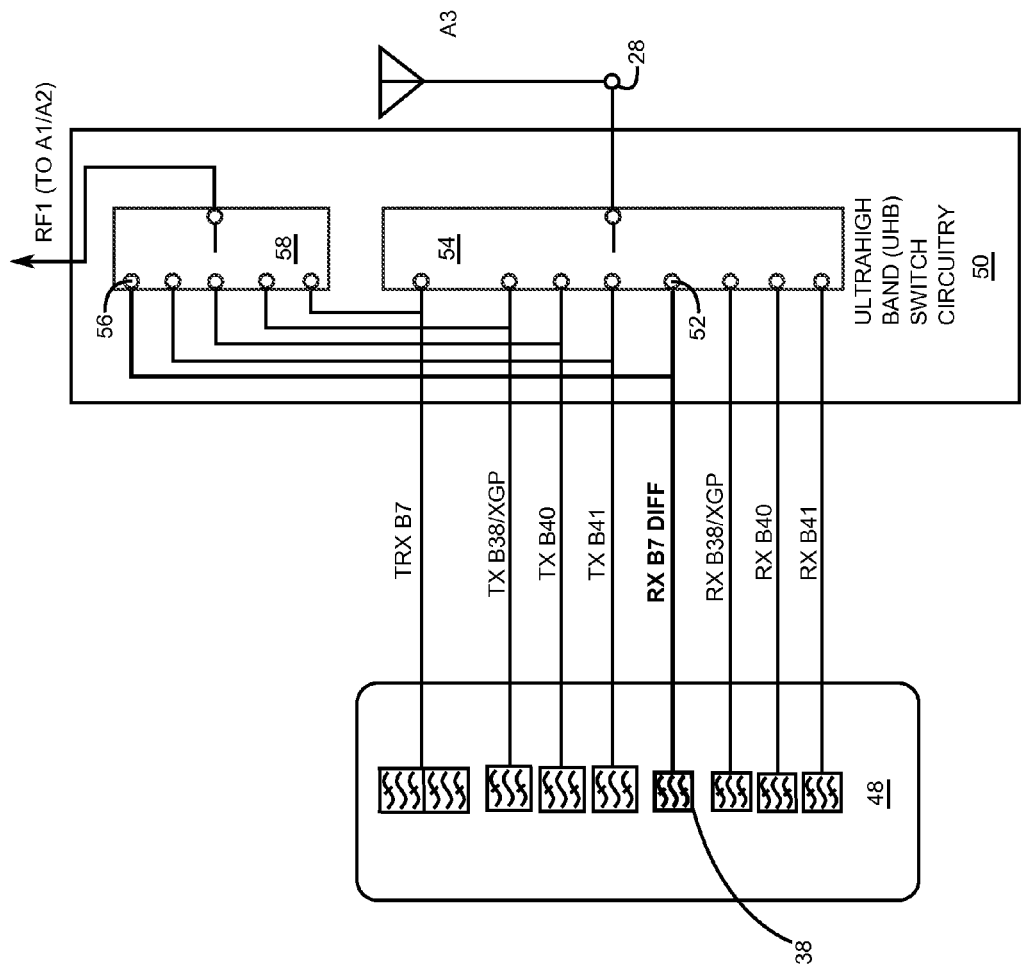
FIG. 3 is a schematic of an internal configuration of ultra-high band (UHB) switch circuitry along with a mixed filter module.

FIG. 3 is a schematic of an internal configuration of the modified UHB switch circuitry 50 coupled to the modified mixed filter module 48. A first B7 switch throw 52 is provided to an antenna switch 54 for selectively coupling the B7 RX path to the UHB antenna port 28. As a result, B7 RX signals can be selectively routed from the UHB antenna A3 to the transceiver circuitry 12. A second B7 switch throw 56 is provided to a transfer switch 58 for coupling the B7 RX path to the RF1 path. Therefore, B7 RX signals can be selectively routed to the transceiver circuitry 12 from the first antenna A1, the second antenna A2 or the UHB antenna A3 via the modified UHB switch circuitry 50 and the modified mixed filter module 48. As a result, the modified diversity switch module 42 is bypassed by the B7 RX path, which allows the linearity requirement of the modified diversity switch module 42 to be reduced to around about +57 dBm since the modified diversity switch module 42 handles only around about −15 dBm of out-of-band blocker levels. Moreover, the modified diversity switch module 42 needs to only tolerate TX leakage signals of +10 dBm between the first antenna A1 and the second antenna A2.

Figure 4:
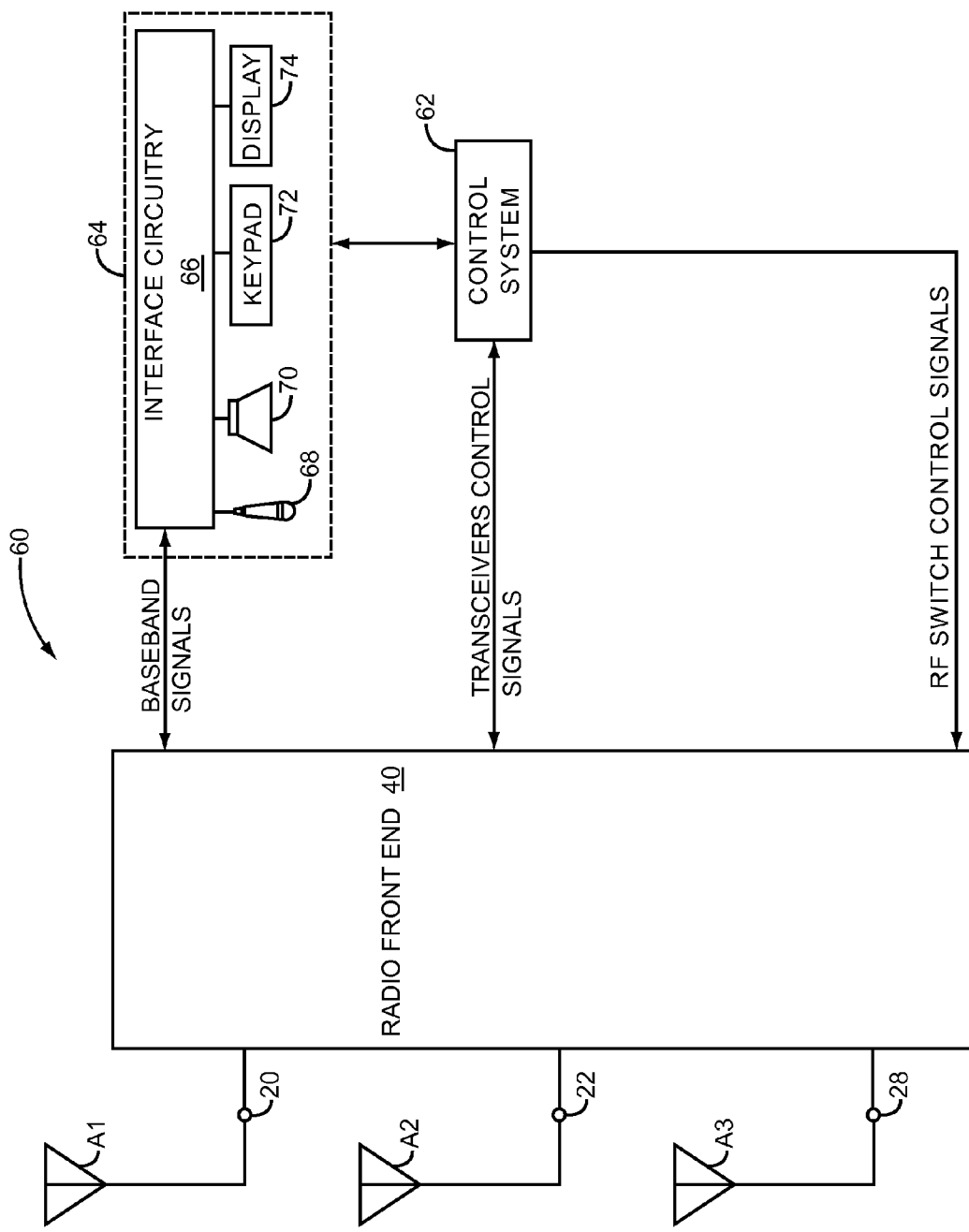
FIG. 4 is a schematic of a world phone/world tablet that incorporates the radio front end of the present disclosure.

FIG. 4 is a schematic of a world phone/world tablet type user equipment 60 that incorporates the radio front end 40 of the present disclosure. A control system 62 provides switch control signals to the radio front end 40 to control switching states for the power amplifier and switch circuitry 14 (FIG. 2), the diversity antenna switch circuitry 18 (FIG. 2), the modified diversity switch module 42 (FIG. 2), and the modified UHB switch circuitry 50. The control system 62 also provides transceivers control signals for the radio front end 40. The transceivers control signals include, but are not limited to, tuning settings to set desired TX/RX frequencies, power level settings for amplifier power levels, and tunable filter settings.

A user may interact with the user equipment 60 via an interface 64, which may include interface circuitry 66 associated with a microphone 68, a speaker 70, a keypad 72, and a display 74. The interface circuitry 66 typically includes analog-to-digital converters, digital-to-analog converters, amplifiers, and the like. Additionally, the interface circuitry 66 may include a voice encoder/decoder, in which case the interface circuitry 66 may communicate directly with a baseband processor (not shown) that is associated with the radio front end 40. The microphone 68 will typically convert audio input, such as the user's voice, into an electrical signal, which is then digitized as baseband signals. Audio information encoded in received signals is recovered by the radio front end 40, and converted to an analog signal suitable for driving the speaker 70 by the interface circuitry 66. The keypad 72 and the display 74 enable the user to interact with the user equipment 60, inputting numbers to be dialed, address book information, or the like, as well as monitoring call progress information.

Those skilled in the art will recognize improvements and modifications to the embodiments of the present disclosure. All such improvements and modifications are considered within the scope of the concepts disclosed herein and the claims that follow.

What is claimed is:

1. A radio front end comprising:
   a diversity switch module adapted to selectively route diversity receive (RX) signals to transceiver circuitry from diversity antenna switch circuitry coupled to at least one diversity antenna port; and
   ultrahigh band (UHB) switch circuitry adapted to:
   selectively route UHB transmit (TX) signals from power amplifier and switch circuitry to either a UHB antenna port or to the at least one diversity antenna port; and
   selectively route UHB RX signals from either the UHB antenna port or from the at least one diversity antenna port to the transceiver circuitry, wherein the UHB RX signals include band 7 (B7) wherein power linearity of the UHB switch circuitry is greater than power linearity of the diversity switch module.

2. The radio front end of claim 1 wherein the UHB switch circuitry is further adapted to:
   selectively route UHB TX signals from power amplifier and switch circuitry to the UHB antenna port and to the at least one diversity antenna port; and
   selectively route UHB RX signals from the UHB antenna port and from the at least one diversity antenna port to the transceiver circuitry.

3. The radio front end of claim 1 wherein a first antenna coupled to a first diversity antenna port is usable as a main antenna and a second antenna coupled to a second diversity antenna port is usable as a diversity RX antenna and vice versa.

4. The radio front end of claim 3 wherein the UHB switch circuitry is further adapted to route the UHB RX signals including B7 to the transceiver circuitry either from the first diversity antenna port or from the second diversity antenna port.

5. The radio front end of claim 3 wherein the diversity switch module is adapted to accept TX leakage signals between the first antenna and the second antenna of no more than around about +10 dBm.

6. The radio front end of claim 1 wherein B7 includes B7 frequency division duplex (FDD) signals to be routed through either the UHB antenna port or through the at least one diversity antenna port to the transceiver circuitry.

7. The radio front end of claim 1 wherein the diversity switch module has a power linearity of no more than around about +57 dBm.

8. The radio front end of claim 1 wherein the diversity switch module is adapted to accept out-of-band blocker levels of no more than around about −15 dBm.

9. The radio front end of claim 1 wherein the UHB switch circuitry accommodates TX and RX signals that range in frequency from around about 2300 MHz to around about 2700 MHz.

10. The radio front end of claim 1 further including a mixed filter module that includes a B7 filter coupled between the transceiver circuitry and the UHB switch circuitry.

11. A user equipment comprising:
   a first antenna;
   a second antenna;
   a third antenna;
   a radio front end comprising:
      diversity antenna switch circuitry having a first diversity antenna port coupled to the first antenna and a second diversity antenna port coupled to the second antenna;
      a diversity switch module adapted to route diversity RX signals to transceiver circuitry from the first antenna and the second antenna selectively coupled to the diversity switch module through the diversity antenna switch circuitry; and
      ultrahigh band (UHB) switch circuitry adapted to:
         selectively route UHB TX signals from power amplifier and switch circuitry to the first antenna, or the second antenna, or the third antenna coupled to a UHB antenna port; and
         selectively route UHB RX signals to the transceiver circuitry from the first antenna, or the second antenna, or the third antenna, wherein the UHB RX signals include B7 wherein power linearity of the UHB switch circuitry is greater than power linearity of the diversity switch module, and
      a control system adapted to control switching states for the diversity switch module, the diversity antenna switch circuitry, and the UHB switch circuitry.

12. The user equipment of claim 11 wherein the first antenna is usable as a main antenna and the second antenna is usable as a diversity RX antenna and vice versa.

13. The user equipment of claim 11 wherein the UHB switch circuitry is further adapted to:
   selectively route UHB transmit (TX) signals from the power amplifier and switch circuitry to the UHB antenna port and to at least one of the first diversity antenna port and the second diversity antenna port; and
   selectively route UHB RX signals to the transceiver circuitry from the UHB antenna port and from the at least one of the first diversity antenna port and the second diversity antenna port.

14. The user equipment of claim 11 wherein the diversity switch module is adapted to accept TX leakage signals between the first antenna coupled to the first diversity antenna port and the second antenna coupled to the second diversity antenna port of no more than around about +10 dBm.

15. The user equipment of claim 11 wherein B7 includes B7 frequency division duplex (FDD) signals to be routed through the UHB antenna port or the first diversity antenna port, or the second diversity antenna port to the transceiver circuitry.

16. The user equipment of claim 11 wherein B7 includes B7 frequency division duplex (FDD) signals to be routed through the UHB antenna port and the first diversity antenna port or the second diversity antenna port to the transceiver circuitry.

17. The user equipment of claim 11 wherein the diversity switch module has a power linearity requirement of no more than around about +57 dBm.

18. The user equipment of claim 11 wherein the diversity switch module is adapted to accept out-of-band blocker levels of no more than around about −15 dBm.

19. The user equipment of claim 11 wherein the UHB switch circuitry accommodates TX and RX signals that range in frequency from around about 2300 MHz to around about 2700 MHz.

20. The user equipment of claim 11 further including a mixed filter module that includes a B7 filter coupled between the transceiver circuitry and the UHB switch circuitry.

* * * * *